(12) United States Patent
Kishimoto (10) Patent No.: US 11,402,274 B2
(45) Date of Patent: Aug. 2, 2022

(54) TEMPERATURE SENSOR DEVICE

(71) Applicant: Mitsubishi Electric Corporation, Tokyo (JP)

(72) Inventor: Hiroyuki Kishimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 467 days.

(21) Appl. No.: 16/442,619

(22) Filed: Jun. 17, 2019

(65) Prior Publication Data

US 2020/0132553 A1 Apr. 30, 2020

(30) Foreign Application Priority Data

Oct. 24, 2018 (JP) .............................. JP2018-199690

(51) Int. Cl.
*G01K 13/00* (2021.01)
*G01K 1/08* (2021.01)
(Continued)

(52) U.S. Cl.
CPC ................ *G01K 1/10* (2013.01); *G01K 1/08* (2013.01); *G01L 9/0054* (2013.01); *G01L 19/0092* (2013.01); *G01K 2205/02* (2013.01)

(58) Field of Classification Search
USPC ....................................... 374/208, 143, 148
See application file for complete search history.

(56) References Cited

U.S. PATENT DOCUMENTS 5,948,989 A * 9/1999 Ichikawa .............. G01L 19/143
73/708
2005/0210990 A1 9/2005 Hayashi et al.
(Continued)

FOREIGN PATENT DOCUMENTS

JP S59-202038 A 11/1984
JP 5-77738 U 10/1993
(Continued)

OTHER PUBLICATIONS

Communication dated Aug. 27, 2019 from Japanese Patent Office in counterpart JP Application No. 2018-199690.
(Continued)

*Primary Examiner* — Mirellys Jagan
(74) *Attorney, Agent, or Firm* — Sughrue Mion, PLLC; Richard C. Turner (57) ABSTRACT

To obtain a temperature sensor device having high reliability and high sensitivity without cost increase. This temperature sensor device includes: a housing provided with a temperature sensor module having a temperature detection element and an external connection terminal connected to the temperature detection element via a lead wire, which are integrated using a first formation member made from a thermoplastic resin, the temperature sensor module being covered with a second formation member made from a thermoplastic resin, so as to form a connector for connecting the external connection terminal to an external signal processing circuit; and a case into which the temperature sensor module is press-fitted and which is opposed to the housing, wherein the first formation member and the second formation member are welded to each other.

14 Claims, 6 Drawing Sheets

(51) Int. Cl.
  *G01K 1/14*    (2021.01)
  *G01K 1/10*    (2006.01)
  *G01L 19/00*   (2006.01)
  *G01L 9/00*    (2006.01)

(56) References Cited

U.S. PATENT DOCUMENTS

| | | | |
|---|---|---|---|
| 2008/0250862 A1* | 10/2008 | Nakabayashi | G01L 23/24 73/756 |
| 2009/0323760 A1* | 12/2009 | Gebauer | G01K 13/02 374/143 |
| 2014/0341255 A1* | 11/2014 | Kaiser | G01L 19/0084 374/143 |
| 2017/0292897 A1 | 10/2017 | Kishimoto | |

FOREIGN PATENT DOCUMENTS

| | | |
|---|---|---|
| JP | 8-327464 A | 12/1996 |
| JP | 2005-274412 A | 10/2005 |
| JP | 2017-58297 A | 3/2017 |
| JP | 2017-187383 A | 10/2017 |

OTHER PUBLICATIONS

Reason for rejection dated Dec. 3, 2019 issued by the Japanese Patent Office in counterpart application No. 2018-199690.
Communication dated Oct. 1, 2019 issued by the Japanese Patent Office in counterpart JP Application No. 2018-199690.

* cited by examiner

TEMPERATURE SENSOR DEVICE

BACKGROUND OF THE INVENTION

1. Field of the Invention

The present disclosure relates to a temperature sensor device.

2. Description of the Background Art

There is known a temperature sensor device as a device for detecting temperature change in intake air flowing in an intake manifold of an internal combustion engine.

The temperature sensor device is, for example, as shown in Patent Document 1, a temperature sensor device of pressure-sensor-combined type including a pressure sensor module and a temperature sensor module. The pressure sensor module detects the pressure of intake air via a pressure introduction passage, and the temperature sensor module has a temperature detection element protected by a high-heat-conductive seal member and provided so as to protrude inside the intake manifold, and performs temperature detection.

Patent Document 1: Japanese Laid-Open Patent Publication No. 2017-187383

In order to enhance reliability by protecting the end of the temperature detection element of the temperature sensor module from external impact and improve temperature responsiveness, it is necessary to apply, to the temperature detection element, a high-viscosity high-heat-conductive seal member filled with a metal-based high-heat-conductive filler. However, since the high-heat-conductive seal member has high viscosity, it takes a very long time to apply the high-heat-conductive seal member, and it is difficult to uniform the application amount and thus the application amount is likely to vary, leading to increase in processing cost. In addition, the high-heat-conductive seal member is expensive, thus causing a problem that the material cost also increases.

SUMMARY OF THE INVENTION

The present disclosure has been made to solve the above problems, and an object of the present disclosure is to obtain high reliability by protection of a temperature detection element without using a high-heat-conductive seal member filled with a metal-based high-heat-conductive filler.

A temperature sensor device according to one aspect of the present disclosure includes: a housing provided with a temperature sensor module having a temperature detection element and an external connection terminal connected to the temperature detection element via a lead wire, which are integrated using a first formation member made from a thermoplastic resin, the temperature sensor module being covered with a second formation member made from a thermoplastic resin, so as to form a connector for connecting the external connection terminal to an external signal processing circuit; and a case into which the temperature sensor module is press-fitted, the case being provided so as to be opposed to the housing, wherein the first formation member and the second formation member are welded to each other.

The temperature sensor device according to one aspect of the present disclosure makes it possible to obtain a temperature sensor device having high reliability while suppressing cost increase because a high-heat-conductive seal member is not used.

DETAILED DESCRIPTION OF THE PREFERRED EMBODIMENTS OF THE INVENTION

In the descriptions of the embodiments and the drawings, parts denoted by the same reference characters indicate the same or corresponding parts.

First Embodiment

The present embodiment will be described with reference to FIG. 1 to FIG. 4. In the present embodiment, a temperature sensor device of pressure-sensor-combined type which is capable of temperature measurement and also pressure measurement at the same time, will be described.

Figure 1:
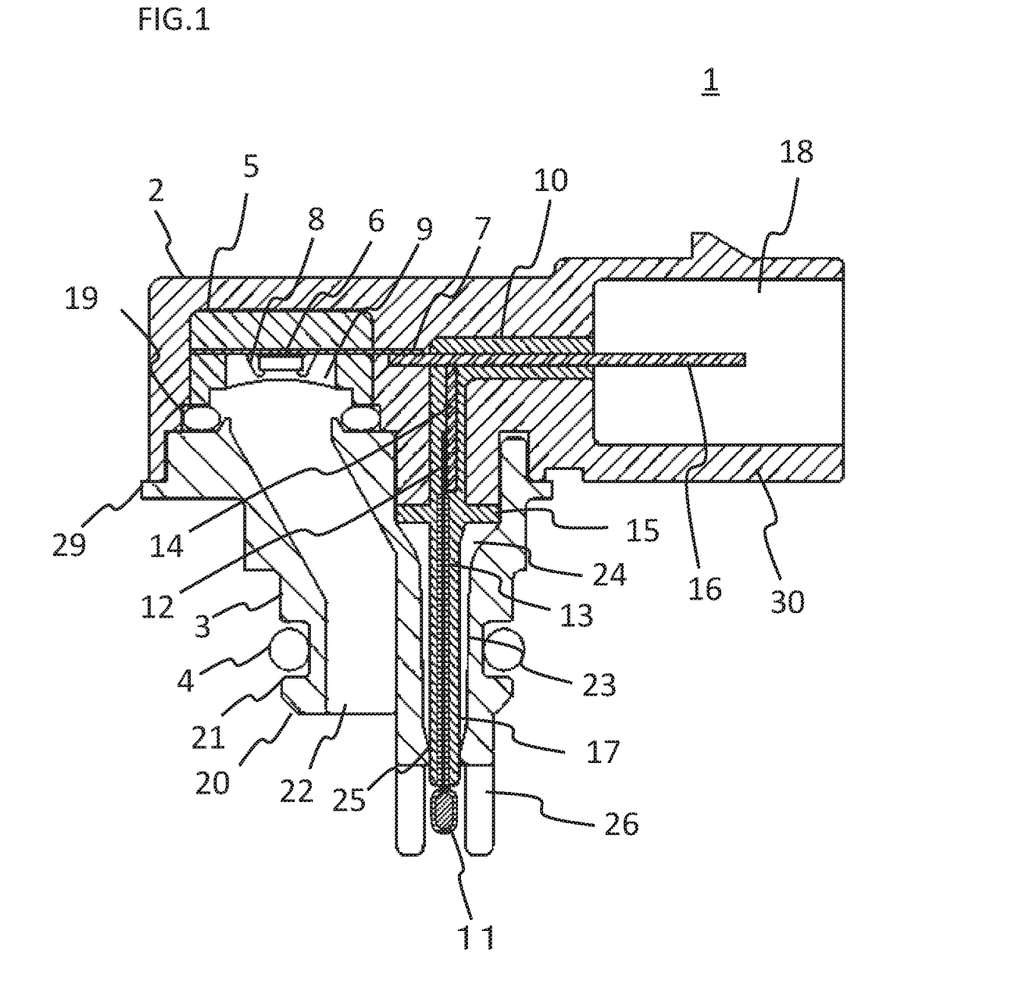
FIG. 1 is a sectional view showing a temperature sensor device according to the first embodiment.
Figure 2:
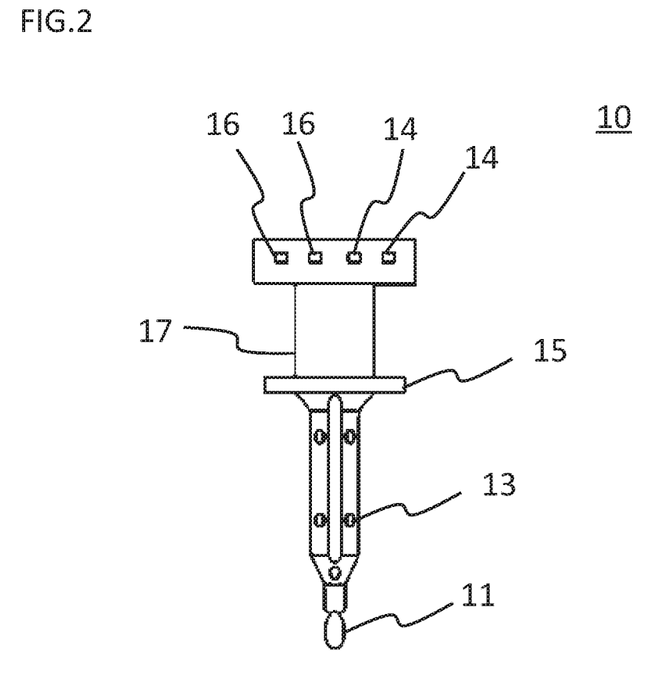
FIG. 2 is a front view showing a temperature sensor module of the temperature sensor device according to the first embodiment.
Figure 3:
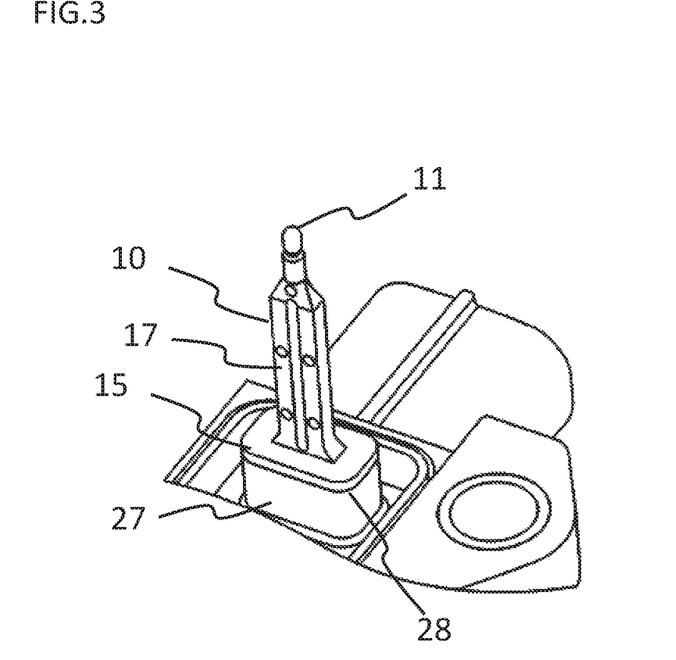
FIG. 3 is a perspective view showing a temperature sensor module attached to a housing of the temperature sensor device according to the first embodiment.
Figure 4:
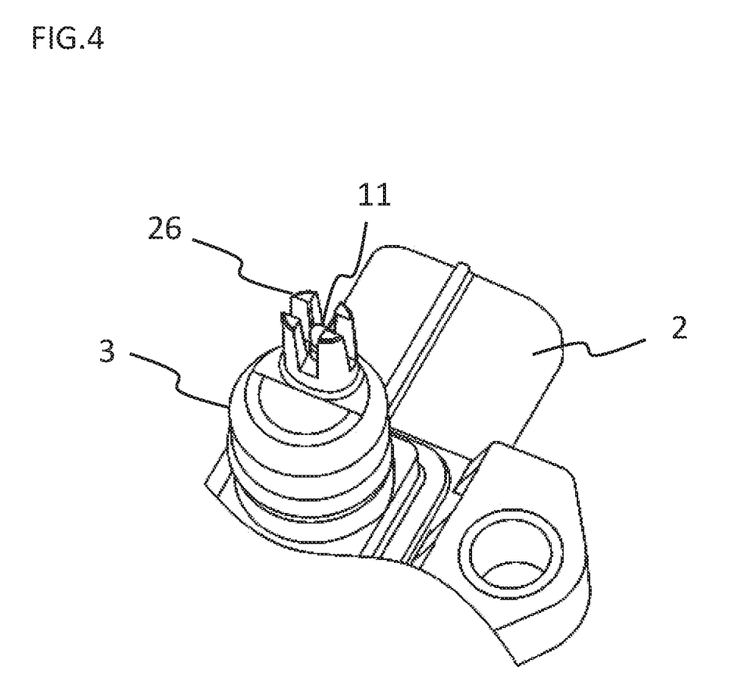
FIG. 4 is a perspective view showing a pillar part around a temperature detection element of the temperature sensor device according to the first embodiment.

FIG. 1 is a sectional view of a temperature sensor device according to the present embodiment. FIG. 2 is a front view of a temperature sensor module of the temperature sensor device according to the present embodiment. FIG. 3 is a perspective view of the temperature sensor module attached to a housing of the temperature sensor device according to the present embodiment. FIG. 4 is a perspective view of a pillar part around a temperature detection element according to the present embodiment.

<Schematic Structure of Temperature Sensor Device>

As shown in the sectional view in FIG. 1, the outer peripheral part of a temperature sensor device 1 is covered with two housings, i.e., a housing 2 covering the upper surface and a case 3 covering the lower surface. The housing 2 and the case 3 are made from a thermoplastic resin. As the thermoplastic resin, Polybutylene terephthalate (PBT) resin, Polyphenylene sulfide (PPS) resin, or the like may be used.

In the housing 2, a pressure sensor module 5 and a temperature sensor module 10 are provided, and external connection terminals 14, 16 for electrically connecting the pressure sensor module 5 and the temperature sensor module 10 with an external signal processing circuit are fixed in a state of protruding in a connector 18 formed in a recessed shape in the housing 2. From the connector 18, connection is made to an external signal processing circuit (not shown) such as a vehicle control unit.

The case 3 opposed to the housing 2 has an almost columnar shape so as to be inserted into an attachment hole (not shown) formed in an intake manifold, and includes a pressure introduction passage 22 for introducing intake air to a pressure detection element 6, and a storage chamber 23 for storing the temperature sensor module 10.

The case 3 and the housing 2 are joined at an outer peripheral portion 29 by welding or bonding, and further, at the inside thereof, an O ring 19 is provided, whereby intake air introduced through the pressure introduction passage 22 is prevented from leaking from the gap between the pressure sensor module 5 and the case 3 and thus airtightness is kept.

A columnar portion 20 to be inserted into the intake manifold has, around the circumferential surface thereof, a groove 21 for attaching an O ring 4, whereby airtightness can be kept when the columnar portion 20 is attached to the intake manifold.

<Structure of Pressure Sensor Module>

As shown in the sectional view in FIG. 1, the pressure sensor module 5 has a structure in which the pressure detection element 6 is connected to a lead frame 7 by a gold wire 8 and covered with a protection member 9 made from fluorine gel. The lead frame 7 is connected to the external connection terminal 16 by welding or soldering, thereby allowing a signal from the pressure detection element 6 to be processed outside.

In the present embodiment, the gold wire 8 is used for connection between the pressure detection element 6 and the lead frame 7. However, an aluminum wire may be used in the same manner. In addition, as the protection member 9 for protecting the pressure detection element 6, other than fluorine gel, fluorosilicone gel or the like may be used.

In the present embodiment, as the pressure detection element 6 used in the pressure sensor module 5, a diaphragm using a piezoresistive effect and a silicon semiconductor element having a vacuum chamber are used. At the diaphragm, an electric circuit configured from a gauge resistance (not shown) is formed, and the diaphragm deforms in accordance with the pressure of intake air. In accordance with the amount of the deformation, the resistance of the gauge resistance changes, whereby the pressure can be detected. That is, change in the gauge resistance is converted to an electric signal and amplified, and the signal is outputted through the external connection terminal 16 to the external signal processing circuit.

In the present embodiment, as the pressure detection element 6, the semiconductor element using a piezoresistive effect is used. However, without limitation thereto, for example, a detection element of such a type that detects change in capacitance or the like may be used in the same manner.

<Structure of Temperature Sensor Module>

Next, the temperature sensor module 10 will be described. As shown at a center part in the sectional view in FIG. 1, the temperature sensor module 10 is mainly composed of: a temperature detection element 11 and a lead wire 12; a protection film 13 covering these, and the external connection terminals 14, 16; and a formation member 17 which covers almost the entirety of these and which is a thermoplastic resin.

The temperature detection element 11 and the lead wire 12 are electrically connected to each other, and the surfaces thereof are thinly coated with the protection film 13 made from a fluorine-based resin. In the present embodiment, the protection film 13 has a thickness of about 0.2 mm, can protect the temperature detection element 11 and the lead wire 12 from a contaminant and a corrosive substance, and also has an effect of electrically insulating the lead wire 12 from the surroundings.

In the present embodiment, a fluorine-based resin is used as the protection film 13. However, an epoxy resin or the like may be used. In addition, the thickness of the protection film 13 is not limited to 0.2 mm, but it is important to set the thickness of the protection film 13 so as to have an insulation property and a contamination resistance and so as not to inhibit adhesion of the formation member 17 which is a thermoplastic resin for forming constituent parts in insert molding described below. As an example, if the thickness is within a range of about 0.05 mm to 1 mm, the same effect can be obtained.

The temperature detection element 11 is connected to one of both ends of the lead wire 12. The other end is not coated with the protection film 13, and is electrically connected with the external connection terminal 14 by welding or soldering. The temperature detection element 11, the lead wire 12, and the external connection terminal 14 in a state of being electrically connected to each other are placed in a mold, and then integrated by insert molding using the formation member 17 which is a thermoplastic resin, thereby forming the temperature sensor module.

At this time, the external connection terminals 14, 16 are also integrated by insert molding at the same time. Further, in the process of the insert molding, a flange 15 having a shape of protruding around the temperature sensor module 10 is formed using the formation member 17 made from a thermoplastic resin.

FIG. 2 shows a front view of the temperature sensor module 10. In the temperature sensor module 10, the temperature detection element 11 is exposed at the lower part, the flange 15 is formed at a center part so as to protrude therearound, and the external connection terminals 14, 16 to be connected to outside are located at the upper part. Almost the entirety is formed by the formation member 17 which is a thermoplastic resin, and between the temperature detection element 11 and the flange 15, a through hole is formed at a center part in relation to two lead wires 12 included inside the formation member 17.

It is noted that four round shapes seen at the formation member 17 having the through hole and branched into two, and one round shape positioned in a direction toward the temperature detection element 11, are holes as a trace of a jig for fixing the lead wires 12 in the mold at the time of insert molding. Inside the round holes, the lead wires 12 covered with the protection films 13 can be seen.

In this state, the surface of the temperature detection element 11 is thinly covered with the protection film 13 (the protection film 13 is not shown in the drawing), but is not covered with the formation member 17 made from a thermoplastic resin, and thus is exposed. As the temperature detection element 11, a thermistor element using temperature change in electric resistance may be used, for example. As the formation member 17 for integrating the temperature detection element 11 and the like, a thermoplastic resin such as PBT resin or PPS resin may be used as in the housing 2 and the case 3.

In insert molding, the formation member 17 made from a thermoplastic resin is placed around the lead wires 12, whereby, in assembling of the temperature sensor device, or the like, deformation, bending, or the like of each lead wire 12 can be prevented. Specifically, in some cases, the lead wire 12 has a thickness of about 0.2 mm in diameter, and by the insert molding, the lead wire 12 can be covered with the formation member 17 having a thickness of about several mm or greater. Therefore, the strength can be greatly enhanced, and deformation and the like can be prevented.

As shown in FIG. 2, the formation member 17 covering the lead wires 12 and the external connection terminals 14 has such a shape that the sectional area is large near a part where the lead wires 12 and the external connection terminals 14 are connected (upper part in the drawing), and conversely, the sectional area of the formation member 17 reduces toward the temperature detection element 11 positioned at the end part. Owing to this shape, the heat capacity of the formation member 17 decreases at the temperature detection element 11 part near the end, and thus the temperature responsiveness of the temperature detection element 11 can be improved.

<Structure of Housing>

As shown in FIG. 1, the external connection terminal 16 of the temperature sensor module 10 is welded with the lead frame 7 protruding from inside of the pressure sensor module 5, and thereby electrically connected thereto, and the pressure sensor module 5 and the temperature sensor module 10 are integrated via the external connection terminal 16. In the present embodiment, welding is used for the connection. However, any method that enables electrically stable connection may be used, and other than the welding, it is also possible to make the connection by normal soldering.

The pressure sensor module 5 and the temperature sensor module 10 that are integrated are fixed in the mold, and then insert molding is performed using a formation member 30 made from a thermoplastic resin, whereby the housing 2 is formed. The formation member 17 of the temperature sensor module 10 has the flange 15 protruding therearound. In a process in which the temperature sensor module 10 is fixed in the mold and the housing 2 is molded, the flange 15 and the formation member 30 of the housing 2 both of which are made from thermoplastic resins are welded and joined to each other and thus are brought into close contact with each other, whereby a contaminant or the like can be prevented from entering inside of the housing 2.

FIG. 3 shows a perspective view of the temperature sensor module attached to the housing of the temperature sensor device. The temperature sensor module 10 is fixed in the mold and insert molding is performed using the formation member 30 made from a thermoplastic resin, whereby a close-contact portion 28 is formed by welding and joining between a base portion 27 formed at the housing 2 and the flange 15 formed by the formation member 17 and protruding from the temperature sensor module 10. Owing to the close-contact portion 28 formed by the welding and joining, entry of a contaminant or the like is prevented and thus reliability can be improved.

In the present embodiment, the close-contact portion 28 has a quadrangular shape with round corners. However, even in the case of using a circular shape, an elliptic shape, a quadrangular shape, or the like, the same effect can be obtained.

<Structure of Case>

As shown in the sectional view in FIG. 1 and the perspective view in FIG. 4, the columnar portion 20 for insertion into the intake manifold is provided to the case 3 attached so as to be opposed to the housing 2 obtained by integrating the pressure sensor module 5 and the temperature sensor module 10 by insert molding. In the columnar portion 20, the storage chamber 23 into which the temperature sensor module 10 is to be inserted, and the pressure introduction passage 22 for ensuring a space toward the pressure sensor module 5, are formed.

As shown in FIG. 1, the storage chamber 23 has an opening 24 having a large diameter, at the upper part in contact with the housing 2, and has an opening 25 having a small diameter, at the lower part. The diameter of the storage chamber 23 has a tendency of decreasing toward the end side (downward in FIG. 1). The temperature sensor module 10 is press-fitted into the storage chamber 23, and the flange 15 part and the end part where the formation member 17 is thinned are held by pressing the inner walls at the large opening 24 and the small opening 25 of the storage chamber 23.

As shown in FIG. 4, pillars 26 are formed at the end of the storage chamber 23 of the case 3. The pillars 26 protrude to be higher than the end of the temperature detection element 11 so as to protect the temperature detection element 11 from being damaged. As shown in FIG. 4, the pillars 26 are located at four corners of the temperature detection element 11 so as not to disturb flow in the intake manifold and so as not to influence temperature detection. Owing to the arrangement of the pillars 26, the temperature detection element 11 is protected, and at the same time, can directly sense the temperature of flow in the intake manifold, whereby the temperature responsiveness can be maintained.

In the present embodiment, an example in which the number of pillars is four has been shown. However, without limitation thereto, it is possible to apply any number or arrangement that ensures protection of the temperature detection element and flow in the intake manifold for high temperature responsiveness.

In the temperature sensor device 1 of the present embodiment, the temperature detection element 11 of the temperature sensor module 10 exposed from the case 3 is protected by the plurality of pillars 26, the flange 15 protruding around the temperature sensor module 10 and the housing 2 are welded and joined to be brought into close contact with each other, and further, the temperature sensor module 10 is press-fitted into the storage chamber 23 of the case 3, whereby the flange 15 and the end part are respectively fitted to the openings 24, 25 of the storage chamber 23 with no gaps therebetween.

Thus, it is possible to obtain a temperature sensor device 1 of pressure-sensor-combined type in which, since a high-heat-conductive seal is not used, cost increase is suppressed, and which has high temperature responsiveness, prevents entry of a contaminant, and has high reliability.

Second Embodiment

Figure 5:
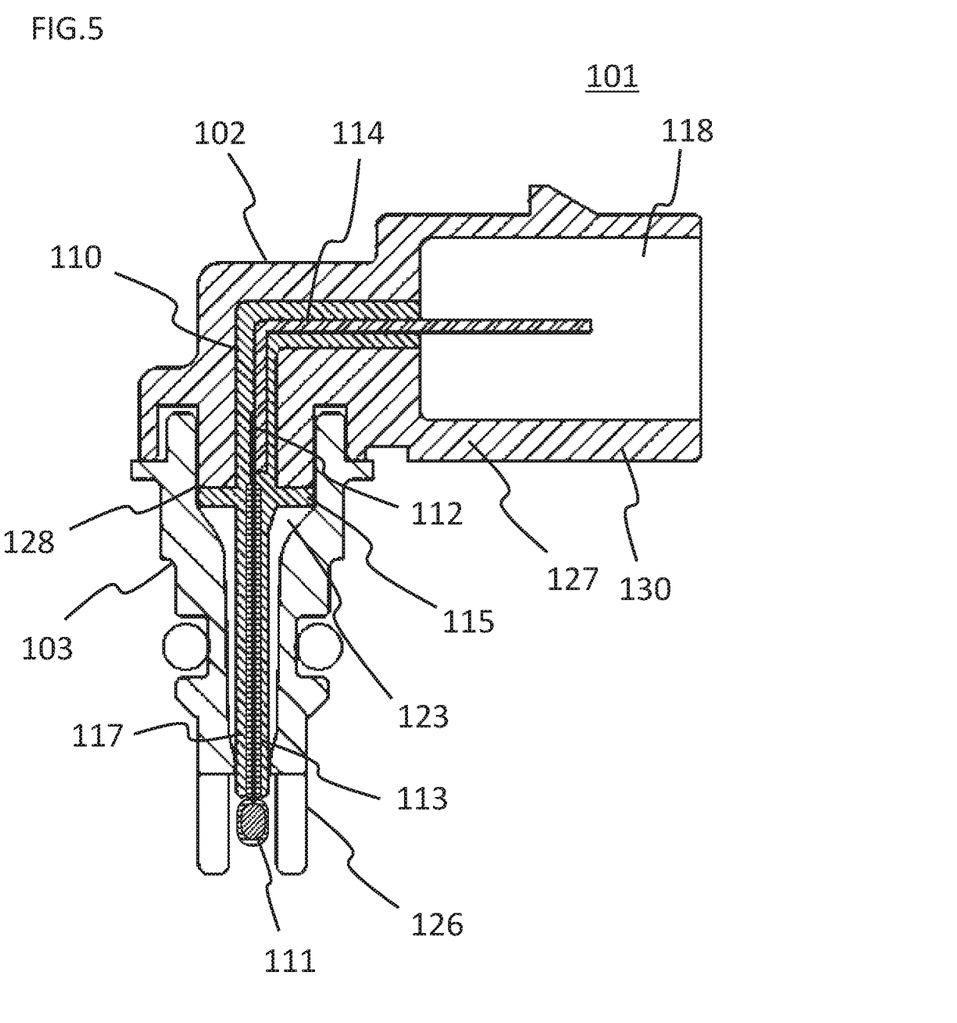
FIG. 5 is a sectional view showing a temperature sensor device according to the second embodiment.
Figure 6:
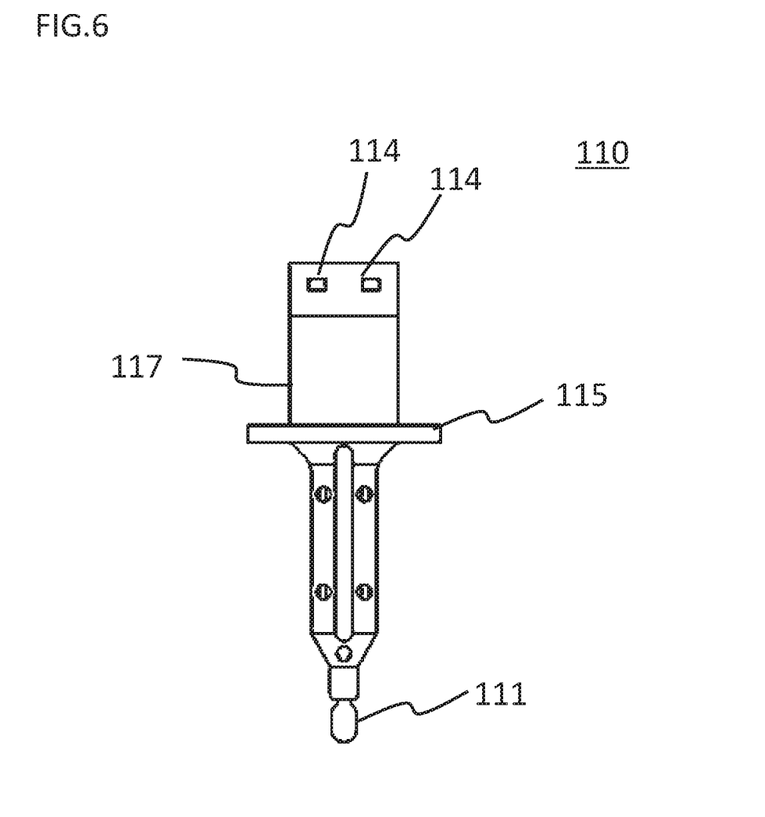
FIG. 6 is a front view showing a temperature sensor module of the temperature sensor device according to the second embodiment.

The present embodiment relates to a temperature sensor device 101 having only a temperature sensor function without having the pressure sensor module 5. With reference to FIG. 5 and FIG. 6, the temperature sensor device 101 according to the present embodiment will be described.

FIG. 5 shows a sectional view of the temperature sensor device 101 according to the present embodiment. FIG. 6 shows a front view of a temperature sensor module 110 used for the temperature sensor device 101 according to the present embodiment.

A case 103 has a storage chamber 123 for storing the temperature sensor module 110, but does not have the pressure introduction passage 22 because the temperature sensor device of the present embodiment does not have the pressure sensor module 5.

At a connector 118, only an external connection terminal 114 connected from the temperature sensor module 110 is formed, and the external connection terminal 16 connected to the pressure sensor module 5 is not formed. As shown in FIG. 6, the entire shape of the temperature sensor module 110 is basically the same as that of the temperature sensor module 10 in the first embodiment.

That is, a lead wire 112 and a temperature detection element 111 covered with a protection film 113 are molded by insert molding using a formation member 117 made from a thermoplastic resin, the temperature detection element 111 is exposed at the end part, and the formation member 117 has such a shape that is thinned at the end part.

The relationship between the temperature sensor module 110 and a housing 102 is the same as that in the first embodiment. That is, a flange 115 of the temperature sensor module 110 is welded with a base portion 127 of a formation member 130 forming the housing, so as to form a close-contact portion 128, and the temperature sensor module 110 and a part of the inner wall of the storage chamber 123 of the housing 102 are fitted to each other with no gaps therebetween.

Further, at the end part of the case 103, the temperature detection element 111 is exposed, and around the temperature detection element 111, pillars 126 higher than the temperature detection element 111 are provided at four corners.

As compared to the temperature sensor device 1 of pressure-sensor-combined type in the first embodiment, the temperature sensor device 101 of the present embodiment is different in that the pressure sensor module 5 is not provided and the temperature sensor device 101 is dedicated for a temperature sensor. However, as compared to conventional devices, the temperature sensor device 101 of the present embodiment does not use a high-heat-conductive seal member and thus can suppress cost increase. In addition, since the temperature detection element 111 is exposed and the periphery thereof is protected by the pillars 126, temperature responsiveness is high, and at the same time, the temperature detection element 111 can be protected.

The flange 115 of the temperature sensor module 110 and the housing 102 are joined by welding so as to form the close-contact portion 128 together with the base portion 127 of the housing 102, whereby entry of a contaminant is prevented and thus a highly reliable temperature sensor device 101 can be obtained.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 101 temperature sensor device
2, 102 housing
3, 103 case
4 O ring
5 pressure sensor module
6 pressure detection element
7 lead frame
8 gold wire
9 protection member
10, 110 temperature sensor module
11, 111 temperature detection element
12, 112 lead wire
13, 113 protection film
14, 114 external connection terminal
15, 115 flange
16 external connection terminal
17, 30, 117, 130 formation member
18, 118 connector
19 O ring
20 columnar portion
21 groove
22 pressure introduction passage
23, 123 storage chamber
24, 25 opening
26, 126 pillar
27, 127 base portion
28, 128 close-contact portion
29 outer peripheral portion

What is claimed is:

1. A temperature sensor device comprising:
a housing provided with a temperature sensor module having a temperature detection element and an external connection terminal connected to the temperature detection element via a lead wire, wherein the temperature detection element, the external connection terminal, and the lead wire are integrated using a first formation member made from a thermoplastic resin, the temperature sensor module being covered with a second formation member made from a thermoplastic resin so as to form a connector for connecting the external connection terminal to an external signal processing circuit; and
a case into which the temperature sensor module is press-fitted, the case being provided so as to be opposed to the housing, wherein
the first formation member and the second formation member are welded to each other, wherein
the temperature sensor module has a flange protruding therearound and made from the first formation member, wherein
the case has a storage chamber into which the temperature sensor module is press-fitted, and wherein
both an end part of the first formation member and the flange press an inner wall of the storage chamber.

2. The temperature sensor device according to claim 1, wherein
the housing is provided with a pressure sensor, and
the case has a pressure introduction hole at a position opposed to the pressure sensor.

3. The temperature sensor device according to claim 1, wherein
the first formation member is formed so as to be thinned toward an end of the temperature sensor module.

4. The temperature sensor device according to claim 3, wherein
the temperature detection element is exposed from an opening at an end of the storage chamber formed in the case.

5. The temperature sensor device according to claim 4, wherein
at the opening, pillars are formed so as to surround the exposed temperature detection element.

6. The temperature sensor device according to claim 1, wherein
the temperature detection element is exposed from an opening at an end of the storage chamber formed in the case.

7. The temperature sensor device according to claim 6, wherein
at the opening, pillars are formed so as to surround the exposed temperature detection element.

8. The temperature sensor device according to claim 7, wherein
the pillars protrude more than the exposed temperature detection element.

9. The temperature sensor device according to claim 1, wherein
the flange and the second formation member are welded to each other.

10. The temperature sensor device according to claim 9, wherein
the temperature detection element is exposed from an opening at an end of the storage chamber formed in the case.

11. The temperature sensor device according to claim 10, wherein
at the opening, pillars are formed so as to surround the exposed temperature detection element.

12. The temperature sensor device according to claim 9, wherein
the first formation member is formed so as to be thinned toward an end of the temperature sensor module.

13. The temperature sensor device according to claim 12, wherein
the temperature detection element is exposed from an opening at an end of the storage chamber formed in the case.

14. The temperature sensor device according to claim 13, wherein
at the opening, pillars are formed so as to surround the exposed temperature detection element.

* * * * *